(12) United States Patent
Sinha et al.

(10) Patent No.: US 7,317,990 B2
(45) Date of Patent: Jan. 8, 2008

(54) DISTRIBUTED PROCESSING SYSTEM FOR SUBSURFACE OPERATIONS

(75) Inventors: Anshuman Sinha, Houston, TX (US); Alain Dumont, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/163,209

(22) Filed: Oct. 10, 2005

(65) Prior Publication Data

US 2006/0089816 A1   Apr. 27, 2006

Related U.S. Application Data

(60) Provisional application No. 60/621,787, filed on Oct. 25, 2004.

(51) Int. Cl.
*G01V 11/00* (2006.01)

(52) U.S. Cl. ......................................................... 702/6

(58) Field of Classification Search .................... 702/6, 702/13, 9
See application file for complete search history.

(56) References Cited

U.S. PATENT DOCUMENTS

| | | | |
|---|---|---|---|
| 4,543,648 A | | 9/1985 | Hsu |
| 5,204,965 A | | 4/1993 | Guthery et al. |
| 5,291,137 A | | 3/1994 | Freeman |
| 5,381,092 A | | 1/1995 | Freeman |
| 5,587,966 A | | 12/1996 | Kimball et al. |
| 5,881,310 A | | 3/1999 | Airhart et al. |
| 5,975,204 A | * | 11/1999 | Tubel et al. ............ 166/250.15 |
| 6,021,198 A | | 2/2000 | Anigbogu et al. |
| 6,101,445 A | * | 8/2000 | Alvarado et al. ............... 702/9 |
| 6,105,059 A | | 8/2000 | Al-Karmi |
| 6,134,676 A | | 10/2000 | VanHuben et al. |
| 6,140,817 A | | 10/2000 | Flaum et al. |
| 6,192,316 B1 | | 2/2001 | Hornby |
| 6,229,308 B1 | | 5/2001 | Freedman |
| 6,255,819 B1 | | 7/2001 | Day et al. |
| 6,285,955 B1 | * | 9/2001 | Goldwasser ..................... 702/6 |
| 6,337,568 B1 | | 1/2002 | Tutunji et al. |
| 6,356,844 B2 | * | 3/2002 | Thomas et al. ................. 702/12 |
| 6,443,228 B1 | * | 9/2002 | Aronstam et al. ....... 166/250.11 |
| 6,446,137 B1 | | 9/2002 | Vasudevan et al. |
| 6,519,568 B1 | | 2/2003 | Harvey et al. |
| 6,826,483 B1 | * | 11/2004 | Anderson et al. ............. 702/13 |
| 6,870,920 B2 | | 3/2005 | Henits |
| 2004/0103139 A1 | | 5/2004 | Hubbard et al. |
| 2004/0245018 A1 | | 12/2004 | Bloom et al. |

FOREIGN PATENT DOCUMENTS

| | | |
|---|---|---|
| WO | WO 2004/036395 | 4/2004 |
| WO | WO 2004/053528 | 6/2004 |

* cited by examiner

*Primary Examiner*—Donald E McElheny, Jr.
(74) *Attorney, Agent, or Firm*—Karan Singh; Jaime Castano; Dale Gaudier (57) ABSTRACT

A method for distributed processing in a subsurface environment includes running a local program on a local computation unit, wherein the local program is configured to call a remote procedure to be executed by a remote computation unit, wherein the local computation unit and the remote computation unit are disposed in a subsurface environment; initiating a remote procedure call; executing the remote procedure on the remote computation unit, while the local computation unit performs another operation; and returning a result from the executing the remote procedure to the local computation unit.

21 Claims, 8 Drawing Sheets

DISTRIBUTED PROCESSING SYSTEM FOR SUBSURFACE OPERATIONS

CROSS-REFERENCE TO RELATED APPLICATIONS

This claims priority of U.S. Provisional patent application Ser. No. 60/621,787 filed on Oct. 25, 2004. This Provisional Application is incorporated by reference in its entirety.

BACKGROUND OF INVENTION

1. Field of the Invention

The invention relates generally to methods and systems for data processing. More particularly, the invention relates to techniques for distributed processing on multi-processor acquisition systems.

2. Background Art

Various technology fields and applications (e.g., signal acquisition) place a high demand on limited computational resources. These activities typically demand efficient computation. One such industry is the oil and gas industry. In this field, various tools are used to probe formations penetrated by a borehole in order to locate hydrocarbon reservoirs and to determine the types and quantities of hydrocarbons. During such logging processes, a tool is typically lowered into a borehole, either after the well has been drilled or while the well is being drilled. In the case of sonic logging, acoustic energy is transmitted from a source into the borehole and surrounding formation. The sonic waves that travel in the formation are then detected with one or more receivers.

For logging-while-drilling (LWD) sonic logging, it is desirable to send selected data uphole in real-time via conventional telemetry means (e.g., mud pulse telemetry). Mud telemetry is a common method used in LWD operations to transmit log data to the surface. Mud telemetry makes use of the modulations of the pressure of drilling fluid pumped through the drilling assembly to drill the wellbore. The fluid pressure modulation, however, can only transmit data at a rate of a few bits per second.

Figure 1:
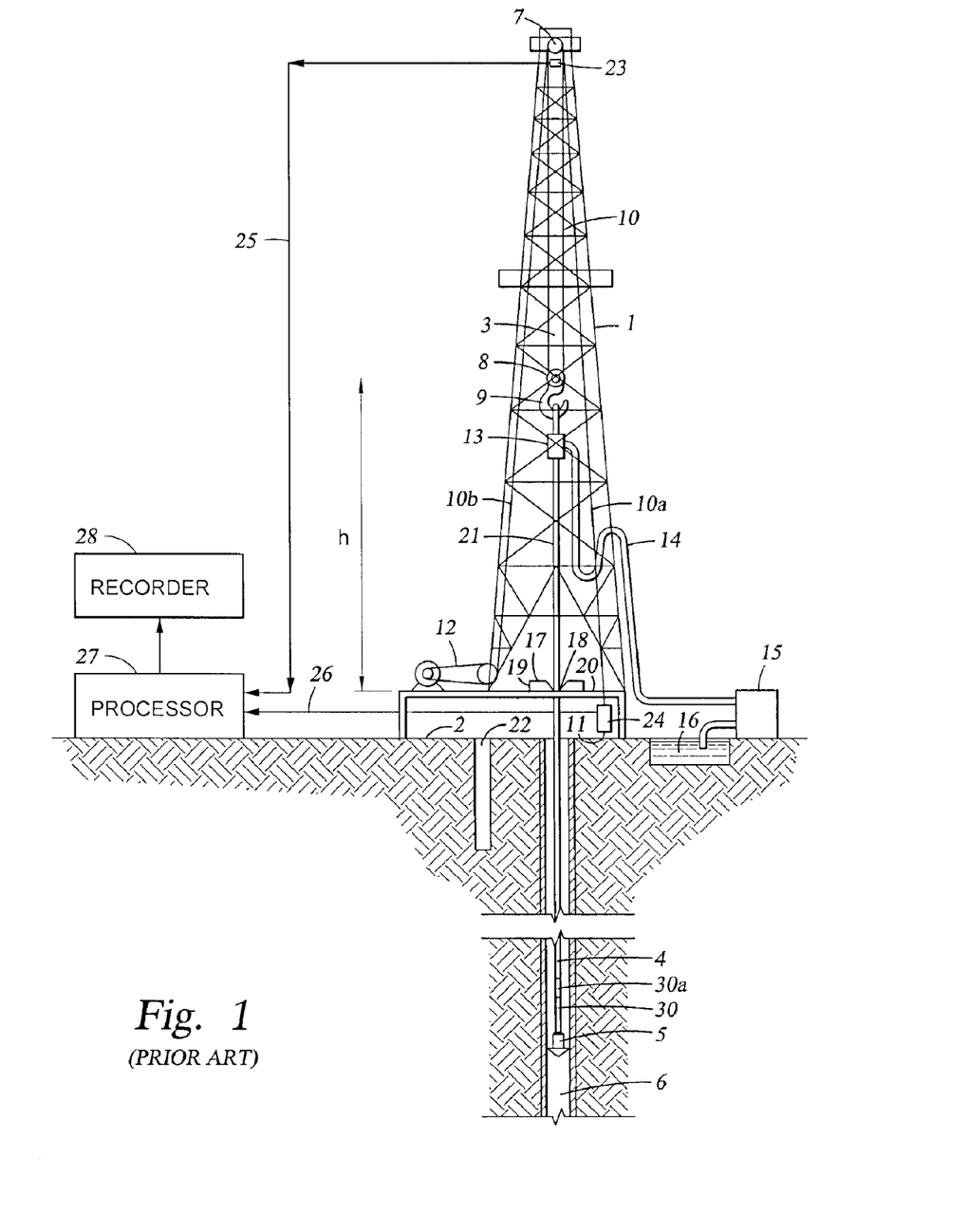
FIG. 1 shows a conventional drilling system with an LWD tool in a bore hole.

FIG. 1 shows a general illustration of a drilling rig and a drill string with a downhole logging tool in a borehole. The rotary drilling rig shown comprises a mast 1 rising above ground 2 and is fitted with a lifting gear 3. A drill string 4 formed of drill pipes screwed one to another is suspended from the lifting gear 3. The drill string 4 has at its lower end a drill bit 5 for the drilling well 6. Lifting gear 3 consists of crown block 7, the axis of which is fixed to the top of mast 1, vertically traveling block 8, to which is attached hook 9, cable 10 passing round blocks 7 and 8 and forming, from crown block 7, on one hand dead line 10a anchored to fixed point 11 and on the other active line 10b which winds round the drum of winch 12.

Drill string 4 is suspended from hook 9 by means of swivel 13, which is linked by hose 14 to mud pump 15. Pump 15 permits the injection of drilling mud into well 6, via the hollow pipes of drill string 4. The drilling mud may be drawn from mud pit 16, which may be fed with surplus mud from well 6. The drill string 4 may be elevated by turning lifting gear 3 with winch 12. Drill pipe raising and lowering operations require drill string 4 to be temporarily unhooked from lifting gear 3; the former is then supported by blocking it with wedges 17 in conical recess 18 in rotating table 19 that is mounted on platform 20, through which the drill string passes. The lower portion of the drill string 4 may include one or more tools, as shown at 30, for investigating downhole drilling conditions or for investigating the properties of the geological formations. Tool 30 shown is an acoustic logging tool having at least one transmitter and a plurality of receivers spaced therefrom.

Variations in height h of traveling block 8 during drill string raising operations are measured by means of sensor 23 which may be an angle of rotation sensor coupled to the faster pulley of crown block 7. Weight F applied to hook 9 of traveling block 8 may also be measured by means of strain gauge 24 inserted into dead line 10a of cable 10 to measure its tension. Sensors 23 and 24 are connected by lines 25 and 26 to processing unit 27 which processes the measurement signals and which incorporates a clock. Recorder 28 is connected to processing unit 27, which is preferably a computer. In addition, the downhole sonic tool 30 may include a processing unit 30a. The downhole processing unit 30a and/or the surface processing unit 27 may be involved in data acquisition, data processing, and telemetry.

The bandwidth of mud pulse telemetry is often the bottleneck of the logging process. Therefore, it is often necessary to process the raw data downhole and send only the extracted information uphole in order to minimize the bandwidth demand. Various analysis methods are available for deriving formation properties from the sonic log data. Among these, the slowness-time-coherence (STC) method is commonly used to process the acoustic signals for coherent arrivals, including the formation compressional, shear, and borehole Stoneley waves. See U.S. Pat. No. 4,594,691 issued to Kimball et al. and Kimball et al., Geophysics, Vol. 49 (1984), pp. 264-28. This method systematically computes the coherence (C) of the signals in time windows which start at a given time (T) and have a given window moveout slowness (S) across the array. The 2D plane C(S,T) is called slowness-time plane (STP). All the coherent arrivals in the waveform will show up in the STP as prominent coherent peaks. The three attributes of the coherent peaks, peak coherent values (COPK) and the peak locations in the slowness-time plane (DTPK and TTPK), represent extracted information that is typically sent uphole.

The above description, using sonic logging as an example, highlights the demand on limited computational resources of a downhole tool. Various other activities downhole (e.g., signal acquisition) also demand efficient computation. A typical LWD tool has a single Digital Signal Processor (DSP) for acquiring signals and perhaps a controller for controlling the DSP and for communication with other computational units on the tool or the surface processor. Communications between different downhole computational units, e.g., DSPs and controllers, are generally through synchronous messages with application layer commands and responses. The synchronous messaging requires that the requesting unit wait for results to be returned from the remote computing unit before the request unit can continue with the next task. Such an approach is wasteful of the limited computing resources available in many computing environments. Thus a need remains for more efficient computational approaches in various fields and applications, such as in the subsurface environment.

SUMMARY OF INVENTION

One aspect of the invention relates to methods for distributed processing in a subsurface or downhole environment. A method in accordance with one embodiment of the invention includes running a local program on a local computation unit, wherein the local program is configured to call a remote procedure to be executed by a remote computation unit, wherein the local computation unit and the remote computation unit are disposed in a subsurface environment; initiating a remote procedure call; executing the remote procedure on the remote computation unit, while the local computation unit performs another operation; and returning a result from the executing the remote procedure to the local computation unit.

Another aspect of the invention relates to methods for logging a subsurface formation property. A method in accordance with one embodiment of the invention includes running an acquisition program on at least two computation units disposed in a well traversing the formation; and coordinating activities between the at least two computation units using a remote procedure call.

Another aspect of the invention relates to methods for processing data in a subsurface or downhole environment. A method in accordance with one embodiment of the invention includes dividing data analysis into at least two separate processes to be run on at least two computation units in a downhole tool; performing the data analysis on the at least two computation units; and collating results from the data analysis on the at least two computation units into a final result.

Another aspect of the invention relates to systems for distributed processing in a subsurface or downhole environment. A system in accordance with one embodiment of the invention includes at least one processor, comprising a local computation unit and a remote computation unit; and at least one memory, wherein the at least one processor and the at least one memory are located in a subsurface environment, wherein the at least one memory stores at least one program having instructions for: running a local program on the local computation unit, wherein the local program is configured to call a remote procedure to be executed by the remote computation unit; initiating a remote procedure call; executing the remote procedure on the remote computation unit, while the local computation unit performs another operation; and returning a result from the executing the remote procedure to the local computation unit.

Another aspect of the invention relates to downhole tools. A tool adapted for subsurface disposal in accordance with one embodiment of the invention includes at least one processor; and at least one memory, wherein the at least one memory stores at least one program that comprise a remote procedure call facilitator.

Other aspects and advantages of the invention will be apparent from the following description and the appended claims.

BRIEF SUMMARY OF THE DRAWINGS

FIG. 8B shows a slowness-time coherence diagram as derived from the waveforms of FIG. 7A using a prior art STC processing.

DETAILED DESCRIPTION

Embodiments of the invention relate to methods and systems for distributed processing. Though not limited to any particular field, the disclosed techniques are particularly suitable for downhole or subsurface applications. Some embodiments of the invention relate to using distributed processing to acquire and process logging data in a downhole tool. Some embodiments of the invention relate to methods for achieving static load distribution (e.g., during sonic logging) in a logging tool using distributed processing. Some embodiments of the invention relate to downhole tools capable of multiple processes using distributed processing.

In accordance with embodiments of the invention, downhole distributed processing may be achieved by distributing multiple tasks among multiple processes running on a single processor or multiple processors. One of ordinary skill in the art would appreciate that a single physical processor may be divided into multiple logical units for running multiple processes. For simplicity of illustration, the following description may use multiple processors' to include one or more physical units of processors. In addition, this description uses 'computation unit' to refer to a unit for running a process. Separate computation units may comprise separate physical units of processors or separate logical units of a processor. Furthermore, the following description may use 'local' computation unit and 'remote' computation unit to refer to a client unit and a server unit, respectively; the use of local and remote do not refer to distance or location.

Figure 2:
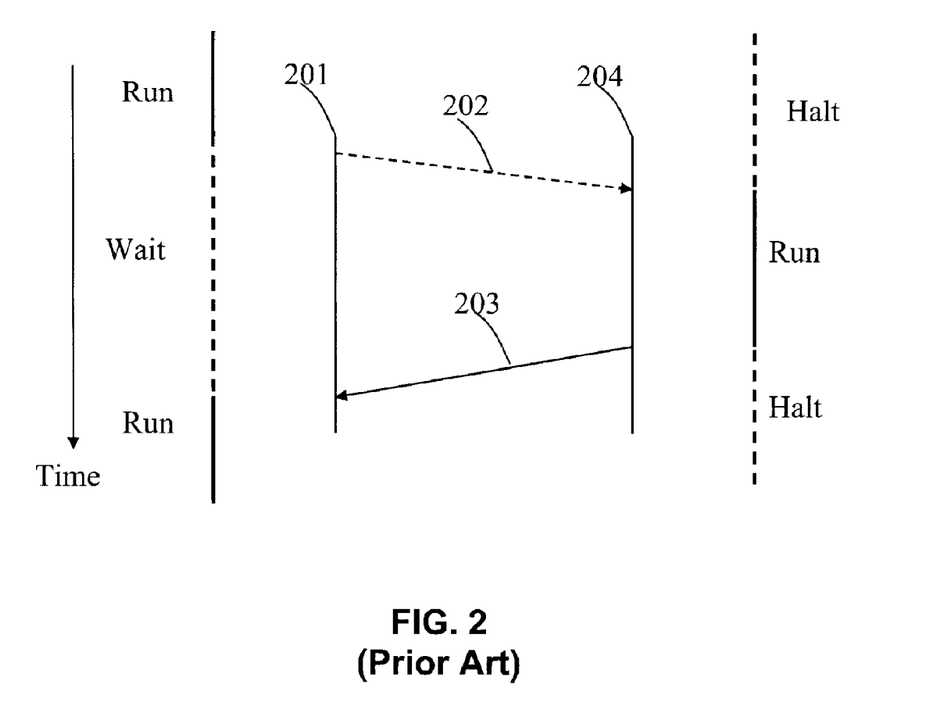
FIG. 2 shows a prior art simple command response type of synchronous messaging.

As noted above, conventional downhole communications are achieved with synchronous messaging, which wastes a significant amount of limited computing resources in a downhole tool. FIG. 2 illustrates a typical communication protocol used in a conventional downhole tool. As shown, after client processor 201 sends a command 202, the client processor 201 waits for a response 203 to arrive from server 204, where computation is performed. The 'wait' time, represented by the dashed line, is the period of time during which a calling task is waiting while the available computation power is being wasted. In a downhole acquisition system, the communication task is typically the highest-priority task. As a result, nothing else gets done until the communication is completed, i.e., the calling unit must wait for the response message 203 to be returned before tackling the next task. An implementation of this embodiment could entail an explicit opening of a network connection, transferring of data, and closing of the session. This sequence (call and wait) would be repeated multiple times if the computation being performed requires remote function. This means that processing wait time may be multiplied many times, leading to very inefficient use of downhole computing resources.

To avoid wasting computing resources and to improve the efficiency of downhole processes, embodiments of the invention use distributed processing, in which the computation may be performed in multiple processors (physical or logical units). Communications between different computing units may be implemented with various methods, such as remote procedure call (RPC), follow-up RPC, remote method invocation (RMI), etc.

In accordance with embodiments of the invention, a method that uses an RPC for communications between downhole computation units may include the following components: (1) a user program, which calls a remote method; (2) a set of stub procedures that interface with transport protocol; (3) a marshaller and unmarshaller to transport method arguments (parameters) and local context to a remote computation unit; (4) RPC runtime support to manage kernel and program space writing; and (5) a static binder to locate the function in a set of computation units.

In accordance with one embodiment of the invention, a server program may be used to define an interface using Interface Definition Language (IDL). The IDL may define names, parameters and types for all client callable server procedures. Then, a stub compiler reads IDL and produces client-side and server-side stubs.

On the client side, the client stub may be implemented by a software developer to interface with a client-side marshalling system function, which packages the method arguments (parameters) and local runtime context for transport to a remote computation unit (e.g., a server). An unmarshalling function (which may be the same program as the client-side marshalling function) is adapted to unravel method arguments (parameters) from the returned response for forwarding to client's calling function.

Similarly, on the server side, a software developer, for example, may write a skeleton (e.g., a kernel) that includes the server stub. The server stub is designed to interface with an unmarshalling system function, which unravels transport layer messages received from the client side, unbinds the called function, and calls the method with appropriate arguments. A server side marshalling function (which may be the same program as the unmarshalling function) is adapted to package computational results into a form suitable for transport to the client side.

Figure 6:
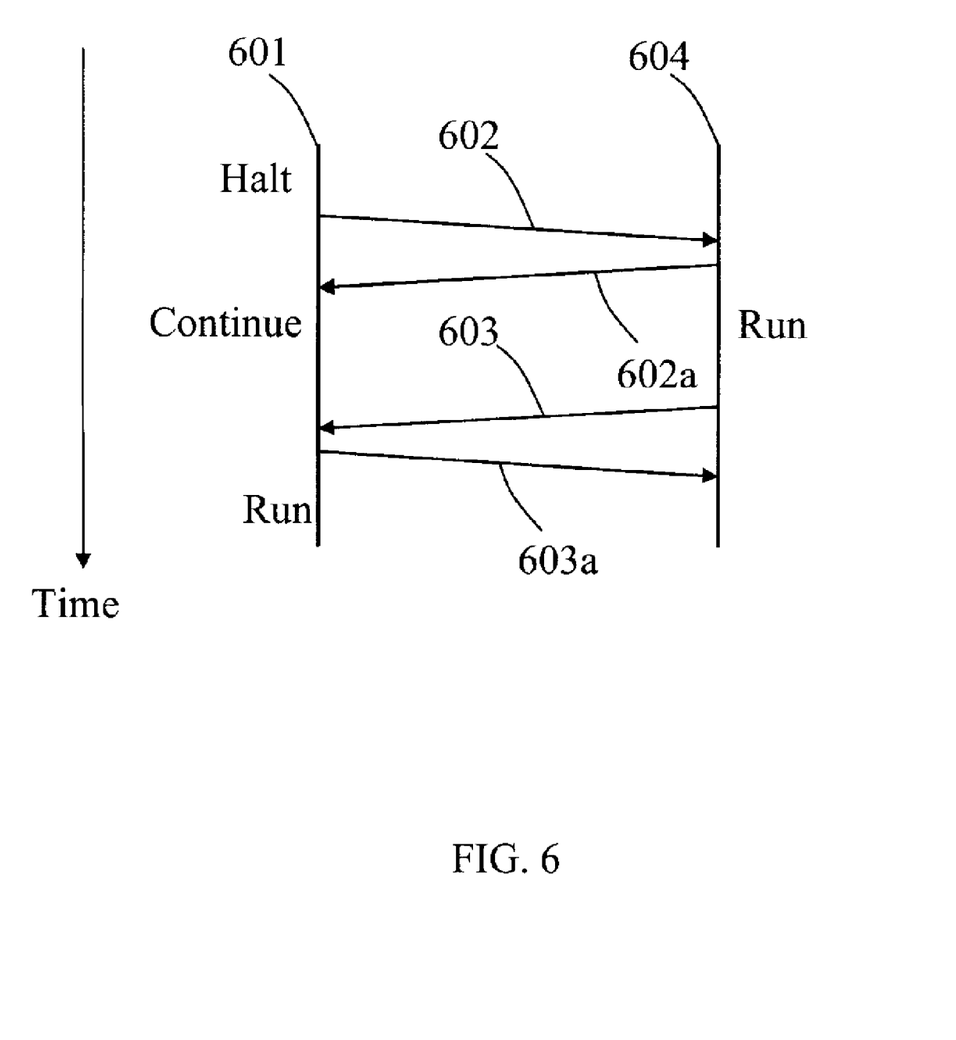
FIG. 6 shows an example involving two asynchronous follow-up RPC interaction that can be used to achieve distributed processing in accordance with an embodiment of the invention.

In accordance with some embodiments of the invention, a variation of a follow-up RPC may involve two asynchronous RPCs. This has the advantage of reducing processing time in a downhole environment. FIG. 6 shows one such example. As shown, after sending the first request 602, a client processor 601 caches the local runtime context and continues with other processes. The server 604 acknowledges the receipt of request 602a. After finishing the computation, the remote server 604 returns the result 603 to the client 601. The client processor may then send an acknowledgment 603a upon receipt of the results.

Figure 3:
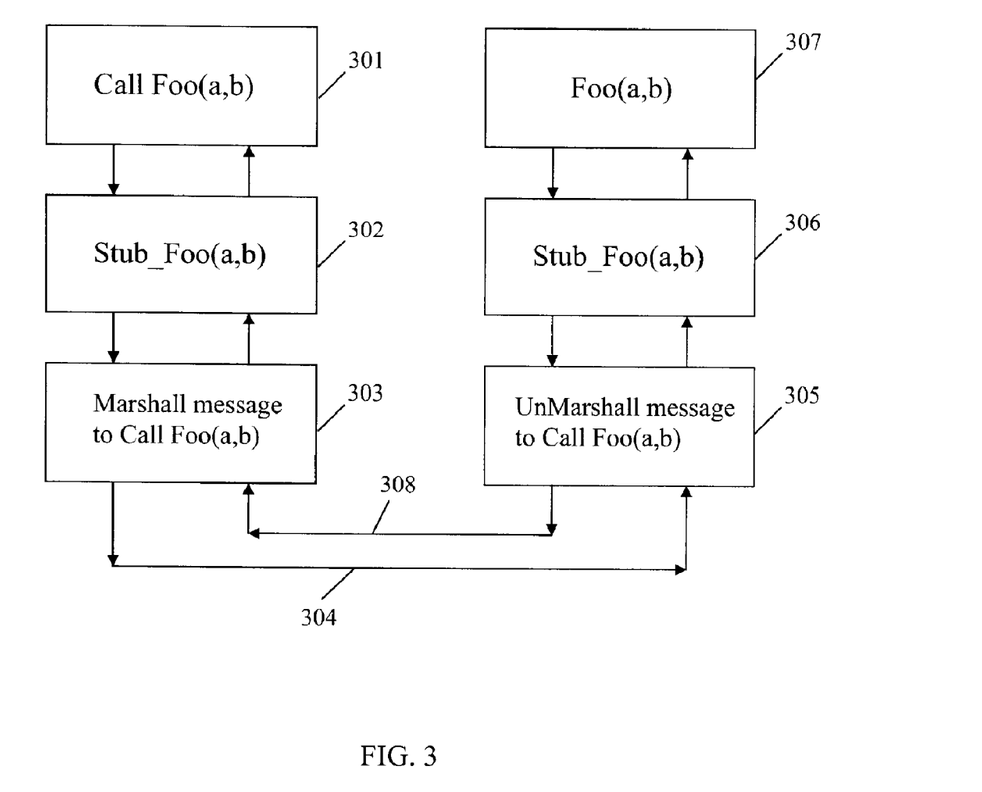
FIG. 3 shows a flow diagram illustrating steps involved in a Remote Procedure Call (RPC) in accordance with an embodiment of the invention.

On the server side, an unmarshalling function then unravels the method arguments and function calls, and forward this information to the server stub (step 305). The server stub then calls the relevant server procedure with the proper method arguments (step 306). Computation was performed by the server program that has been called by the client, Foo(a,b), (step 307). The computational results are then handed over to the server stub, which interfaces with an unmarshalling function to package the data for transport. The packaged results are sent back to the client side (step 308). An unmarshalling function on the client side unravels the received messages, sends the extracted parameters (result data) to the client stub function, which then relays the results to the local program that calls the remote procedure. While the above description assumes stub, marshalling, and unmarshalling functions are separate programs, one of ordinary skill in the art would appreciate that these functions may also be part of the same program.

An example of pseudo-code incorporating RPC is given below:

```
Int remote_processing (byte* data)
    {
        data_t t;
            result_t r;
        set_data (&t, data);
        remote_data_process (t, &r);    // remote procedure call
        memcpy (results_buf, r);        // copy data
        return 0;
    }
```

Figure 4:
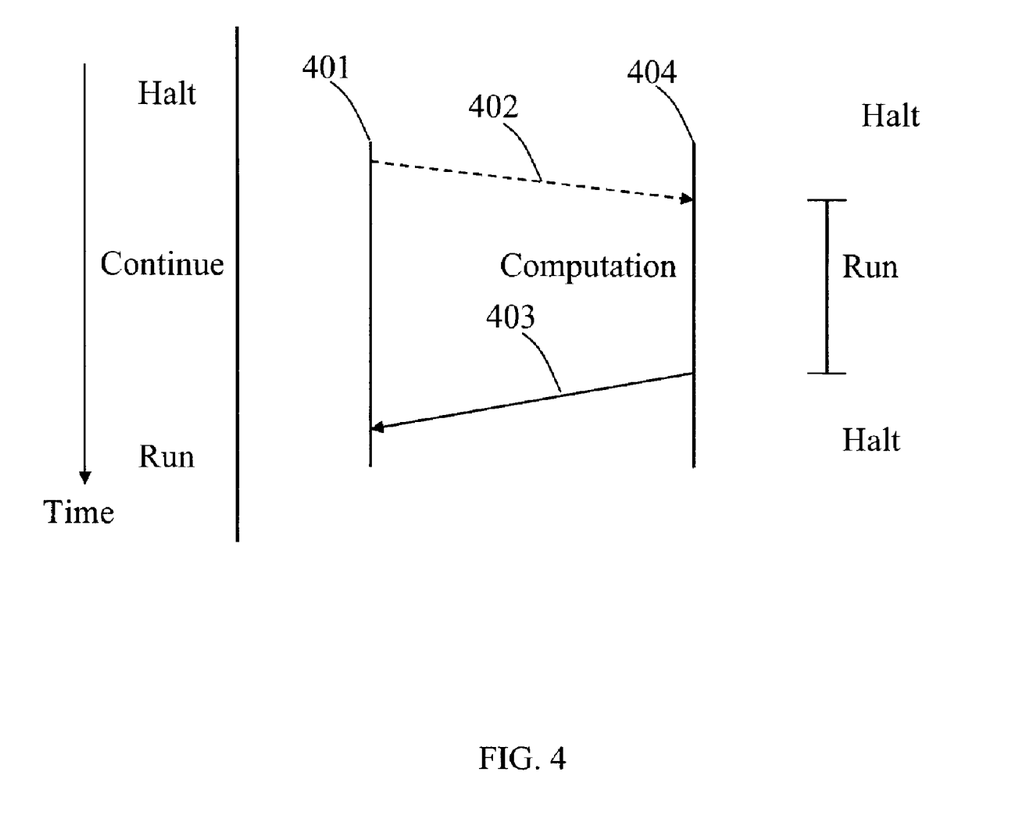
FIG. 4 shows a follow-up RPC in accordance with an embodiment of the invention.

In accordance with some embodiments of the invention, downhole RPC may be done through 'follow-up' RPC, which improves the performance. The timing diagram in FIG. 4 illustrates how time can be saved while sending and receiving messages, using a follow-up RPC. The message 402 is sent by a caller from a client 401, which after sending the message continues with client side local operations. The client side local operations, for example, may include performing computation, data acquisition, data processing, and initiating another procedure call. After computation is finished by a remote computation unit 404, a response 403 is returned to the local client 401. Returning of the response 403 by the remote processor may involve a one-way RPC. In this scheme, the client processor continues with its tasks and does not wait for the response to be returned by the remote processor. Thus, no time is wasted.

Figure 5:
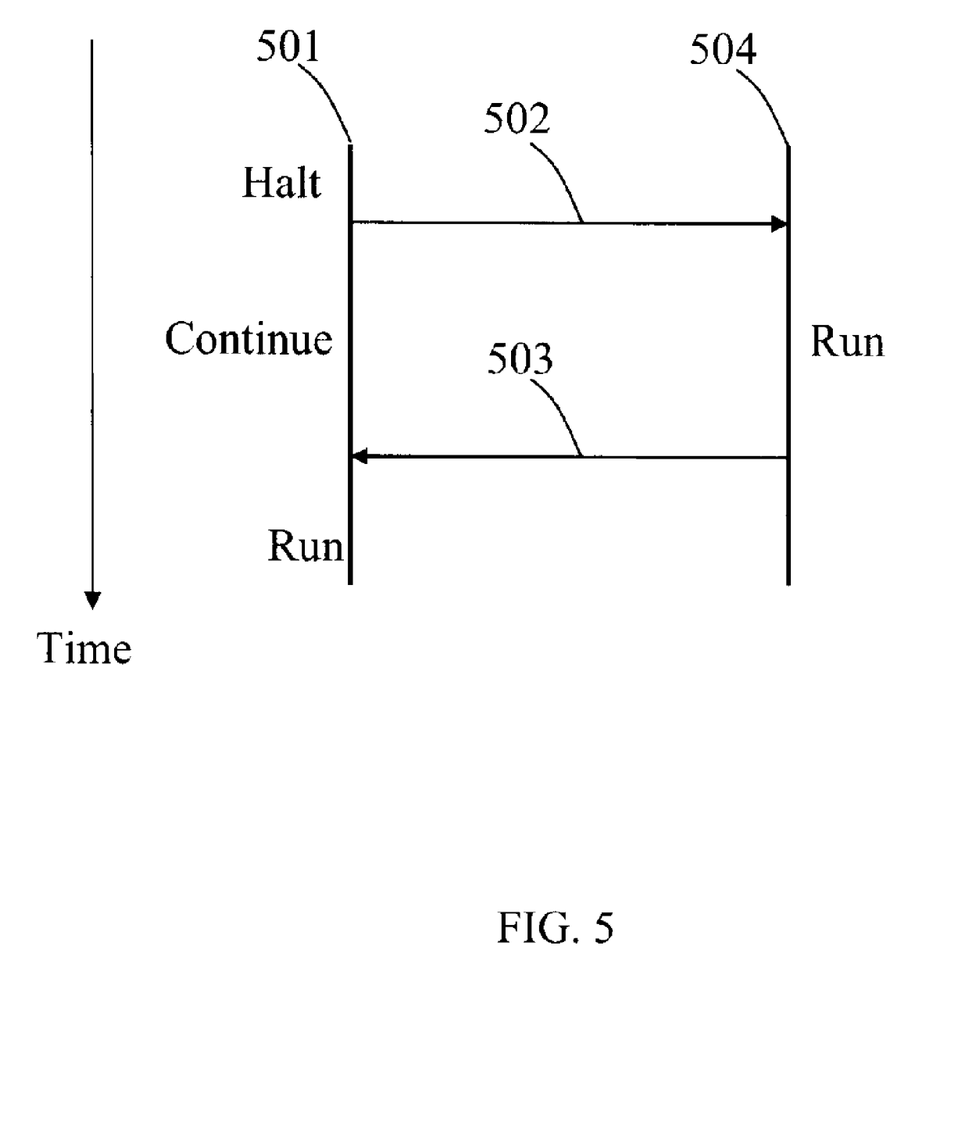

A particular implementation of a follow-up RPC may use a voucher-redemption scheme, as shown in FIG. 5. In one embodiment, the local processor 501 calls a remote procedure 502 and continues with local processing or another call for other remote procedures. The initiator is given a voucher for initiating the remote procedure and waits for its redemption. The redemption happens when the remote processor 504 finishes the computation and a response message 503 is received by the local processor 501.

In accordance with some embodiments of the invention, a variation of a follow-up RPC may involve two asynchronous RPCs. This has the advantage of reducing processing time in a downhole environment. FIG. 6 shows one such example. As shown, after sending the first request 602, a client process 601 caches the local runtime context and continues with other processes. The server 604 acknowledges the receipt of request 602a. After finishing the computation, the remote server 604 returns the result 603 to the client 601. The client processor may then send an acknowledgement 603a upon receipt of the results.

In general, follow-up RPC works well when subsequent local processes do not rely on results to be returned by the server. In downhole processing, this is often the case. If the results are needed for subsequent local processes, the local process may synchronously wait for the results if they are not available when they are needed.

The above description illustrates a single RPC or follow-up RPC. One of ordinary skill in the art would appreciate that such RPCs may be called multiple times. Such multiple RPCs may be called sequentially, or they may overlap temporally. This has the advantage of reducing processing time.

In a downhole RPC, the messages from client to the server are transported over the tool's internal buses, which may include carrier sense multiple access (CSMA) bus systems, which may include collision detection (CSMA/CD). An example of such a bus architecture is a Controller Area Network (CAN). A CAN architecture facilitates the implementation of a downhole RPC because of its built-in capability to prioritize messages and retransmit them upon collision. Typical time to transfer a message from one CAN node to another is on the order of tens of milliseconds. A downhole RPC would improve performance when the time to transport the message from the client to the server and its return is less than twice the performance.

In implementing downhole RPC, possible causes of error should be taken into account. Various causes of error in downhole RPC may include the following: lost request message from the client; lost response from the server; client process crash; server process crash; lost return results; lost acknowledgement from server; and error due to transmission, for example. Conventional error detection and correction codes are commonly used to detect and correct such errors.

Figure 8:
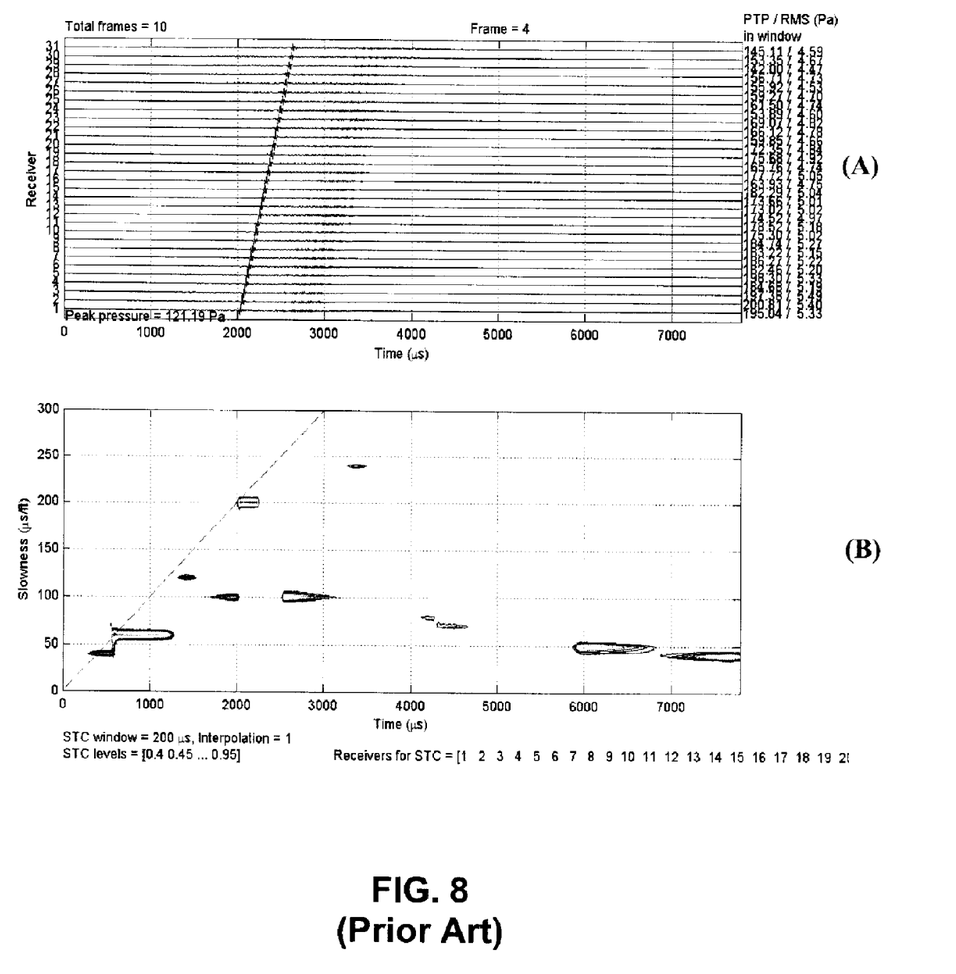
FIG. 8B shows a slowness-time coherence diagram as derived from the waveforms of FIG. 8A using prior art STC processing.
FIG. 8A shows a set of waveforms as received with an array of receivers in a conventional sonic logging operation.

With distributed processing, various tasks in a downhole operation may be distributed or balanced among different processes to improve efficiency. Some embodiments of the invention relate to methods for balancing various tasks in downhole operations. Such load balancing may be for data acquisition or data processing. The specific implementation of these methods will depend on the types of tools. For example, in STC analysis of sonic waveforms, a frequency-based algorithm may be used to search for coherence in a specific frequency range. For example, if the frequency of interest is 12 kHz wide, the analysis may be divided into two frequency bands, for example, 6 kHz each, and processed in parallel. Similarly, balancing of computation load may be achieved by time distribution. For example, to search coherence in a specific slowness range (e.g., a 200 us/ft range), two parallel processes may be used to search for a window of 100 us/ft each. These methods are discussed below in reference to FIG. 8.

Having the capability to run distributed processing also enables a well operator to run some of the operations, which traditionally are run on a surface computer, downhole. Many log data processing operations require a quality check. Due to limited computing resources, such quality checks are performed uphole. For example, conventional sonic processing algorithms are not executed in parallel; the quality check is done by comparison of downhole results with surface post processing. If such quality checks can be performed downhole, the demands on telemetry systems can be reduced.

In accordance with embodiments of the invention, quality check on the accuracy of computation can be done by executing in different computation units downhole. With multiple DSPs and controllers, the complete algorithms or part of the algorithm (e.g., for sonic waveform processing) may be executed in parallel over different downhole microcomputers for verification of the results and quality check. Each computing environment has its own limitations and strengths, and the resultant quality check may help in real-time compensation. An example of a direct implementation in downhole computing environments is in the precision of floating point numbers.

In embodiments using parallel processing, various processes running on different DSPs may be associated by using a common tuple-space definition. For example, in accordance with one embodiment of the invention, association of various processes running on different DSPs in a downhole tool may be given by a 5-tuple-space definition: {protocol, local-address, local process identifier, remote-address, remote process identifier}. Note that this is only an example. One of ordinary skill in the art would appreciate that other tuple-space definitions may also be used without departing from the scope of the invention.

In this example, 'protocol' defines the transport layer protocol; 'local-address' and 'remote-address' specify the local and remote computation units, respectively; and 'local process identification' and 'remote process identification' specify the local program and the remote program, respectively.

In accordance with an embodiment of the invention, RPC preferably uses a transport layer protocol that has the ability to chain, retransmit, and acknowledge data. A unified data format is used in the transport protocol. While various data formats may be used with embodiments of the invention, preferred methods of the invention may use the external data representation (XDR) format to convert data to network format for communication. However, some methods of the invention may use a simplified implementation of downhole RPC that does not require XDR or other specific data format, if the computing entities are based on a common processor and common runtime environment. In addition, the transport protocol may omit security and authentication components in order to improve system performance. Some embodiments may include a simple authentication system to help reduce any type of mismatched requests that might be erroneously received by the server. As noted above, interface definition language (IDL) may be used for defining distributed function interfaces and an IDL compiler may be used to derive the interface from the implementation.

The local and remote computation unit addresses should be unique. For example, a fixed unique three-digit address may be assigned to the computation units. The unique ID addresses may be determined by configuration of the pins.

The process IDs of the listed tasks (i.e., local process and remote process) preferably are pre-defined. An example list of pre-defined process IDs is shown below:

Communication Task—Id 0
Calculation Task—Id 1
systems Task—Id 3
RPC Task—Id 4

The downhole RPCs in accordance with embodiments of the present invention are designed for optimum network performance with minimum overhead to the tool's internal bus system. One approach to minimizing overhead to the tool bus system is to have the database statically built with the marshaller so that the marshaller has a priori knowledge of the function signature and its location in the downhole network of computation units. An example of a signature assigned to the function, which may reside on one of the computation units, is given below:

Function prototype: process_waveform(*wf, *params)
Function return type: byte
Function location address: 4
Function table pointer—Location in function table is 23.
Binding signature—23:4

While distributed processing in accordance with embodiments of the invention has been illustrated with RPC or follow-up RPC, other protocols known in the art, such as remote method invocation (RMI), may also be used. RMI and methods alike are syntactically different from RPC but are conceptually similar.

Some embodiments of the invention relate to downhole tools having the capability of multiple processing. A tool (e.g., 30 in FIG. 1) in accordance with embodiments of the invention includes one or more processors (e.g., the processor 30a in FIG. 1) and algorithms for distributed processing. The distributed processing may use RPC, follow-up RPC, RMI, or similar protocols.

Figure 7:
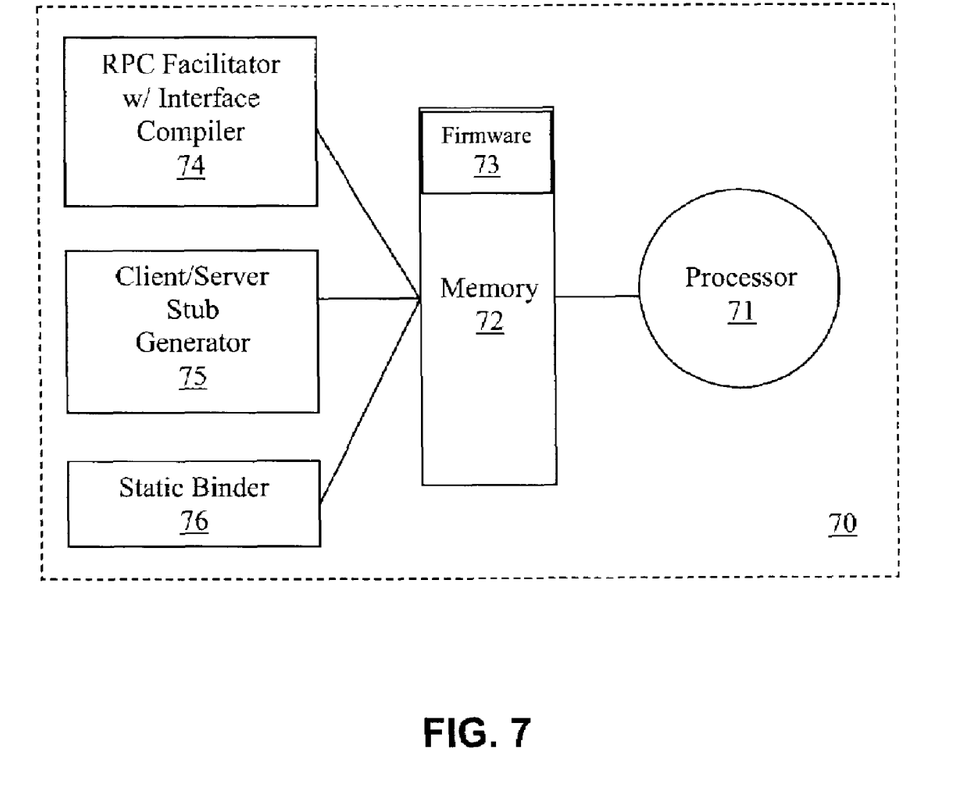
FIG. 7 shows a schematic of components in a downhole tool capable of distributed processing in accordance with an embodiment of the invention.

FIG. 7 shows a downhole tool in accordance with one embodiment of the invention. As shown, the tool 70 may include one or more processor 71 and one or more memory 72. The memory 72 may include read only memory (ROM), readily accessible memory (RAM), or any other memory known in the art. The memory 72 may store one or more programs that can facilitate the development of the tool 70 to perform distributed processing. For example, the programs may include an RPC facilitator 74, which may include an interface compiler, for the generation of programs needed for RPC. The programs may also include stub generator 75 for producing the client and server stubs. In addition, the programs may include a static binder 76 such that the marshaller would have ready access to the necessary database, and hence demand on the tool bus can be minimized. Furthermore, to facilitate the development of distributed processing of the tool 70, the firmware 73 of the tool may need to be modified. Such a system will ease the development of distributed algorithms and result in maximum utilization of hardware. Note that the example shown in FIG. 7 is for illustration only, and this embodiment configuration is not specific to any particular type of tool. One of ordinary skill in the art would appreciate that other modifications are possible without departing from the scope of the invention. For example, the static binder 76 would not be needed if the load on the tool bus is not a concern.

Some embodiments of the invention relate to methods for downhole data acquisition or processing using the distributed processing techniques described above. For data acquisition, various tools have different protocols that can be divided into different tasks that can be handled separately. Such tasks can then be distributed across different processes or different processors to balance the load among the processors and/or to improve data acquisition efficiency. As an example, in sonic or seismic logging, a source is fired at a controlled time, and then an array of receivers, which are spaced apart, are used to record the signals reflected from the formations in a controlled fashion. The various timings and/or individual receivers may be controlled by separate processes in a distributed processing scheme according to embodiments of the invention.

For distributed downhole data processing, methods of the invention may be illustrated using sonic data processing. FIG. 8A shows the waveforms, as recorded by a receiver arrays, using a sonic tool on a 6.75" [17.14 cm] drill collar in a small borehole (HD=8.62" [21.9 cm], DTm=200 us/ft) penetrating a fast formation (DTc=70 us/ft, DTs=150 us/ft). As noted above, such raw data are too voluminous to be transmitted uphole, and it is often necessary to extract only essential information for transmission via mud telemetry.

FIG. 8B shows the slowness-time coherence (STC), illustrating the slownesses and times of various wave components detected by semblance processing, using the methods disclosed in U.S. Pat. No. 4,594,691 issued to Kimball et al. and in Kimball et al., Geophysics, Vol. 49, pp. 264-281, 1984. The processing typically uses selected windows with predetermined widths in the time and frequency domains to scan the expected range of the waveforms for coherence peaks. In accordance with embodiments of the invention, multiple windows in the time domain and/or frequency domain may be used simultaneously in a distributed processing scheme to speed up the data processing.

Embodiments of the invention may be implemented with computational units including processors and electronics in a myriad of apparatus and systems. Various processors may be used, including specific digital signal processors. Furthermore, various memories (or storage means) may be used to store programs having instructions for performing the techniques of the present invention. Some embodiments may include removable storage means, such as a floppy disk, a CD ROM or other optical disk, a magnetic tape, a read-only memory chip (ROM), and other forms of the kind known in the art or subsequently developed. The program of instructions may be in object code or source codes. The precise forms of the program storage device and of the encoding of instructions are immaterial here.

Advantages of the present invention include, but are not limited to: distributed data processing using methods such as RPC, and multiple processors to increase the efficiency of data acquisition and processing. Embodiments of the present invention can reduce acquisition and processing cycles. This is particularly beneficial to oilfield applications. Advantages of the present invention include easier programming, as well as improved real-time performance and code maintainability of software. The RPC enables distributed computing over multiple computation resources, improving real-time results. Static load distribution of sonic algorithms over multiple processors is also achieved.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention as set forth in the appended claims. For example, the disclosed processes/systems may be implemented on any downhole tool or apparatus (e.g., wireline, LWD/MWD, LWT, coiled tubing, long-term monitoring), as well as on surface systems and equipment. The disclosed embodiments may also be implemented to process any data type used in the oilfield industry (e.g., acoustic, resistivity, neutron, density, gamma, seismic, magnetic, imaging).

What is claimed is:

1. A method for distributed processing in a subsurface environment, comprising:

running a local program on a local computation unit, wherein the local program is configured to call a remote procedure to be executed by a remote computation unit, wherein the local computation unit and the remote computation unit are disposed in a subsurface environment;

initiating a remote procedure call;

executing the remote procedure on the remote computation unit, while the local computation unit continues to perform operations; and returning a result from executing the remote procedure to the local computation unit.

2. The method of claim 1, wherein the initiating the remote procedure call comprises:

assembling, on the local computation unit, parameters for the remote procedure;

converting the parameters for the remote procedure and a reference to the remote procedure into a format suitable for transport to the remote computation unit;

transporting the converted parameters and the references to the remote procedure to the remote computation unit;

and unraveling, on the remote computation unit, the parameters for the remote procedure and the reference to the remote procedure.

3. The method of claim 2, wherein the returning the result comprises:
converting the result into a format suitable for transport to the local computation unit; and
transporting the converted result to the local computation unit.

4. The method of claim 2, further comprising issuing an acknowledgement from the remote computation unit to the local computation unit, after the converted parameters is received by the remote computation unit.

5. The method of claim 1, further comprising issuing an acknowledgement from the local computation unit to the remote computation unit, after the result is received by the local computation unit.

6. The method of claim 1, wherein the initiating the remote procedure call uses a remote method invocation.

7. The method of claim 1, wherein the local computation unit and the remote computation unit are disposed in a downhole tool.

8. A method for logging a subsurface formation property, comprising:
running an acquisition program on at least two computation units disposed in a well traversing the formation; and
coordinating activities between the at least two computation units using a remote procedure call.

9. The method of claim 8, wherein the acquisition program is adapted to process data selected from the group consisting of acoustic, resistivity, nuclear, density, gamma-ray, seismic, imaging, and formation pressure.

10. A method for processing data in a subsurface environment, comprising:
dividing data analysis into at least two separate processes to be run on at least two companion units in a downhole tool;
performing the data analysis on the least two computation units; and
collating results from the data analysis on the at least two computation units into a final result.

11. The method of claim 10, wherein the data comprise acoustic waveforms and the dividing is based on frequency.

12. The method of claim 10, wherein the data comprise acoustic waveforms and the dividing is based on time.

13. The method of claim 10, wherein the data comprises data selected from the group consisting of acoustic, resistivity, nuclear, density, gamma-ray, seismic, imaging, and formation pressure.

14. A system for distributed processing in a subsurface environment, comprising:
at least on processor, comprising a local computation unit and a remote computation unit; and
at least one memory,
wherein, the least one processor and the least one memory are disposed in a subsurface environment,
wherein the least one memory stores at least one program having instructions for:
running a local program on the local computation unit, wherein the local program is configured to call a remote procedure to be executed by the remote computation unit;
initiating a remote procedure call;
executing the remote procedure on the remote computation unit, while the local computation unit performs another operation; and
returning a result from the executing the remote procedure to the local computation unit.

15. The system of claim 14, wherein the initiating the remote procedure call comprises:
assembling, on the local computation unit, parameters for the remote procedure;
converting the parameters for the remote procedure and a reference to the remote procedure into a format suitable for transport to the remote computation unit;
transporting the converted parameters and the reference to the remote procedure to the remote computation unit; and
unraveling, on the remote computation unit, the parameters for the remote procedure and the reference to the remote procedure.

16. A tool adapter for subsurface disposal, comprising:
at least one processor; and
at least one memory,
wherein the at least one memory stores at least one program that comprises a remote procedure call facilitator and wherein said at least one program further comprises an interface compiler, a stub generator, and a static binder.

17. The tool of claim 16, wherein the tool is selected from the group consisting of an acoustic tool, resistivity tool, neutron tool, density tool, gamma-ray tool, seismic tool, and imaging tool.

18. A method for distributed processing of data in a subsurface environment including at least two asynchronous remote procedure calls comprising:
running a local program on a local computation unit, wherein the local program is configured to call a remote procedure to be executed by a remote computation unit, wherein the local computation unit and the remote computation unit are disposed in a subsurface environment;
initiating a remote procedure call to the remote processor;
acknowledging receipt of the remote procedure by the remote computation unit;
executing the remote procedure on the remote computation unit and returning the results to the local computational unit;
acknowledging receipt of the results by the local computation unit; and
during the foregoing processes said local computation unit continues to perform operations.

19. The method of claim 18, wherein the data comprise acoustic waveforms and the dividing is based on frequency.

20. The method of claim 18, wherein the data comprise acoustic waveforms and the dividing is based on time.

21. The method of claim 18, wherein the data comprises data selected from the group consisting of acoustic, resistivity, nuclear, density, gamma-ray, seismic, imaging, and formation pressure.

* * * * *